United States Patent [19]

Rattman et al.

[11] Patent Number: 4,614,968

[45] Date of Patent: Sep. 30, 1986

[54] CONTRAST SMOKE DETECTOR

[75] Inventors: William J. Rattman, Bass River; Stephen Marchetti, Norwell; Aaron A. Galvin, Lexington, all of Mass.

[73] Assignee: American District Telegraph Company, New York, N.Y.

[21] Appl. No.: 349,062

[22] Filed: Feb. 16, 1982

[51] Int. Cl.[4] .................. H04N 7/18; G08B 17/10

[52] U.S. Cl. .................. 358/93; 250/573; 250/574; 250/575; 340/630; 358/107; 356/336; 356/343; 356/435; 356/438; 356/439

[58] Field of Search .................. 358/93, 105, 107, 108, 358/106; 340/630; 250/573, 574, 575; 356/335, 336, 435, 438, 439, 343

[56] References Cited

U.S. PATENT DOCUMENTS

| | | | |
|---|---|---|---|
| 2,198,971 | 4/1940 | Neufeld | 356/435 |
| 3,376,425 | 4/1968 | Kraus | 340/630 |
| 3,446,979 | 5/1969 | Ricciardi | 340/630 |
| 3,672,781 | 6/1972 | Rosenblum | 356/438 |
| 3,931,462 | 1/1976 | Exton | 358/108 |
| 4,081,830 | 3/1978 | Mick | 358/105 |
| 4,257,063 | 3/1981 | Loughry | 358/105 |

*Primary Examiner*—Howard W. Britton
*Attorney, Agent, or Firm*—Weingarten, Schurgin, Gagnebin & Hayes

[57] ABSTRACT

A system for detection of smoke by measuring changes in the contrast of a multi-contrast target disposed remotely from a photoelectric sensor. The obscuration of the detection path causes a reduction in the contrast of the sensed target, and a change of predetermined magnitude is employed to trigger an alarm. The target has one or more relatively darker and one or more relatively lighter areas which are viewed by the sensor. The sensor can be composed of a plurality of photosensors each viewing a respective area of the target. Or, the sensor can be a single scanning sensor such as a video camera. Only a single line or segment of a line of the video frame pattern need be employed to monitor the target. The video camera can be employed on a shared basis for providing smoke monitoring and detection, together with other functions, such as intrusion detection, access control, or visual surveillance of an area.

11 Claims, 8 Drawing Figures

CONTRAST SMOKE DETECTOR

FIELD OF THE INVENTION

This invention relates to smoke detection, and more particularly to a passive photoelectric system for detection of smoke or other particles in a path.

BACKGROUND OF THE INVENTION

Photoelectric smoke detectors are known for monitoring a path or area and providing an indication of the presence of smoke or other particles in the monitored area. The detectors are usually of the spot type or beam type. The spot type of detector employs a photoelectric or ionization sensor in a housing, and detects smoke presence in the housing. In the beam type or long path type of detector, a light beam is projected along a path, and a sensor is located at the far end of the path, or at the sending end of the path with a retroreflector placed at the far end of the path to reflect light back to the sending end.

SUMMARY OF THE INVENTION

The present invention provides a system for detection of smoke in an area or path being monitored by measuring changes in the contrast presented by a multicontrast target disposed remotely from a photoelectric sensor. The presence of smoke in the path causes obscuration of the path by attenuation and scattering, resulting in a reduction in contrast of the sensed target. A reduction in contrast of sufficient magnitude is utilized to trigger an alarm. In basic embodiment, the target has one or more relatively darker and one or more relatively lighter areas which are viewed by the sensor to provide a signal representing the relative contrast of the target areas. A change in the sensor signal of predetermined magnitude causes an alarm. The target can be illuminated by ambient light present in the monitored area, or can be actively illuminated by a light source. The sensor can be composed of a plurality of photosensors, each operative to view a respective area of the target. Alternatively, the sensor can be a single scanning sensor such as a video camera disposed for viewing the target.

With a video camera as the sensor, only a single line or segment of a line of the video frame pattern need be employed to monitor the multi-contrast target. As a result, the video camera can be employed on a shared basis for providing smoke monitoring and detection along with other functions, such as intrusion detection, access control, or visual surveillance of an area. As the sensing path becomes obscured, or the light along the sensing path is scattered by smoke particles, the signal derived from the white target area can diminish, while the signal derived from the black target area can increase. In some instances, both signals can increase in the presence of smoke, and this condition can occur, for example, where the target is actively illuminated by a light source and there is scattering of light by the smoke particles, the light being scattered back along the sensing path to the detectors. Under usual operating conditions, the signal derived from the white target area remains substantially constant on both the absence and presence of smoke, while the signal derived from the black target area increases in amplitude. The white signal can be employed as an automatic gain control (AGC) reference to provide a substantially constant threshold level to minimize variations which can be caused by changes in ambient light level.

It is contemplated that the invention is also useful for sensing particles other than smoke which provide similar attenuation and scattering to change the contrast of the target as viewed by the sensor.

DESCRIPTION OF THE DRAWINGS

The invention will be more fully understood from the following detailed description in conjunction with the accompanying drawings, in which.

DETAILED DESCRIPTION OF THE INVENTION

Figure 1:
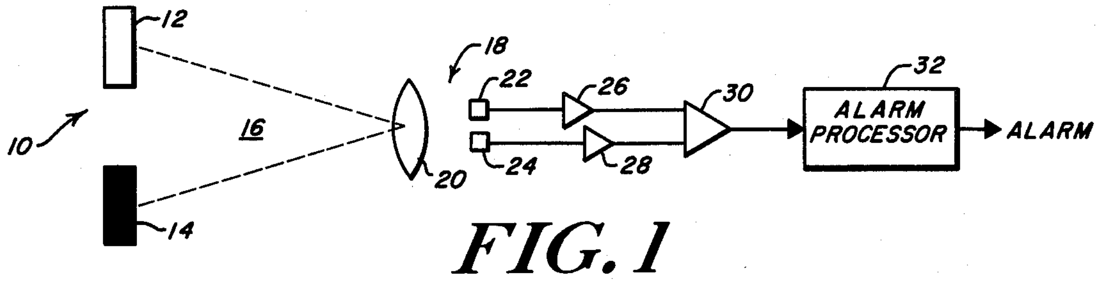
FIG. 1 is a schematic representation of the invention employing a pair of photocells for viewing respective areas of a target.

Referring to FIG. 1, there is shown a target 10 composed of a relatively white area 12 and a relatively black area 14 disposed at one end of a viewing path 16. Sensing apparatus 18 is disposed along path 16 remote from the target 10 and includes a lens or lens system 20 operative to focus the target areas 12 and 14 onto respective photocells 22 and 24. The photocells are connected to respective amplifiers 26 and 28, the outputs of which are coupled to respective inputs of a differential amplifier 30. The output of the differential amplifier 30 is applied to an alarm processor 32 which includes a threshold reference, the exceedence of which will cause an output alarm signal. In operation, the photocell 22 provides a relatively high magnitude output signal in response to the image from the white target area 12, and the photocell 24 provides a relatively low magnitude output signal in response to the image from the black target area 14. These photocell signals, after amplification by respective amplifiers 26 and 28, are applied to the differential inputs of the amplifier 30 which provides an output signal representative of the relative magnitude of the photocell signals. The output signal from amplifier 30 is also representative of the relative contast of the target 10 as viewed by the photocells 22 and 24. In the presence of smoke in path 16, which will cause attenuation and scattering of the light sensible by the photocells, the relative magnitude of the photocell signals will change. Either or both of the photocell signals can change depending on the particular smoke conditions. The output signal from amplifier 30 will change accordingly in response to a change in either or both of the photocell signals. A change in the output signal which exceeds the threshold level in alarm processor 32 causes triggering of an output alarm signal from the alarm processor 32, which can be employed, for example, to energize an audible or visual alarm indicator or to transmit an alarm signal to a central facility.

Figure 2:
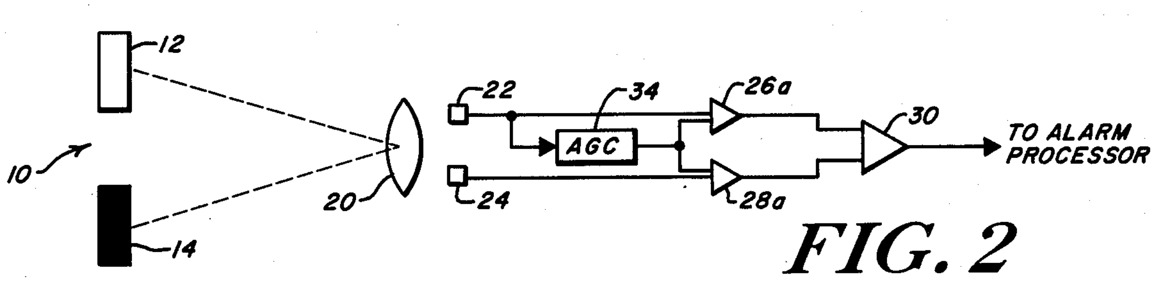
FIG. 2 is a second embodiment of the invention employing an automatic gain control (AGC) in association with the multi-contrast target.

An embodiment of the invention is illustrated in FIG. 2 in which automatic gain control is employed. The photocell 22 viewing the white target area 12 is connected to an AGC circuit 34 which provides an AGC reference signal to the reference inputs of respective amplifiers 26*a* and 28*a*. The photocells 22 and 24 also provide respective signals to the corresponding amplifiers 26*a* and 28*a*. The output of these amplifiers are connected to the respective inputs of differential amplifier 30. The output signal from amplifier 30 is coupled to the alarm processor 32, as in the above embodiment. The white target area 12 provides a reference level which is substantially constant over the expected range of ambient light variation. The photocell 22 provides a signal in response to light received from the white target area 12, and this signal serves as the AGC reference. The embodiment of FIG. 2 is otherwise the same as the embodiment of FIG. 1 described above, and is operative to provide an output signal which is representative of a change in the sensed contrast of the multicontrast target.

It will be appreciated that the terms "black" and "white" are relative, and that the target areas can be relatively lighter and darker to achieve the intended contrast.

Figure 3:
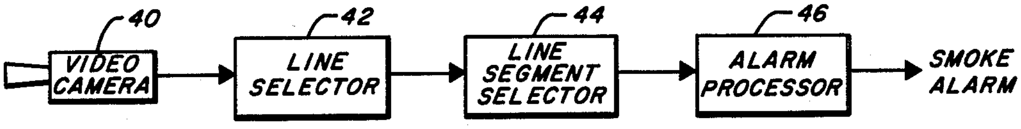
FIG. 3 is a block diagram of an embodiment of the invention employing a video camera and associated processing circuitry.

A further embodiment is illustrated in FIG. 3 and employs a videocamera 40 which is disposed for viewing of a multi-contrast target such as described above. A video output signal is provided by camera 40 to a line selector circuit 42 which is operative to select a predetermined scan line of the video frame pattern and to provide an output signal to a line segment selector circuit 44 which is operative to select a portion of the scan line selected by circuit 42. The output of circuit 44 is applied to an alarm processor 46 which includes a reference threshold and which provides an alarm signal when the threshold has been exceeded by the processed signal from the camera. A scan line of the video frame pattern is selected which traverses or scans the target. The target is usually disposed with the contrast areas extending vertically, and the camera 40 provides a horizontal scan of the target. Thus, the line selector circuit 42 is employed to select a single scan line which will horizontally scan scross the target areas. Since the scan provided by the camera is often wider than the width of the target, only a segment of the selected scan line need be employed for target sensing. The segment of the scan line is as determined by the line segment selector circuit 44. The line selector 42 and line segment selector 44 are thus operative to select a portion of an overall video frame for viewing of the target and for providing an output signal representative of the relative contrast of the target areas.

Figure 4:
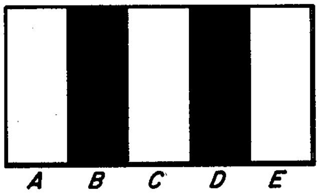
FIG. 4 is a representation of an alternating black and white stripe target useful in the invention.
Figure 5:
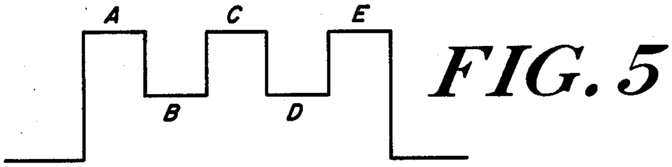
FIG. 5 is a waveform illustrating the relative amplitudes of a signal derived from the target of FIG. 4.

A target is illustrated in FIG. 4 and is composed of vertically disposed white areas labelled "A", "C", and "E", and interposed black vertical areas labelled "B" and "D". The amplitude of the output signal provided by line segment selector 44 is depicted in FIG. 5 and is labelled correspondingly to the labelled areas of the target of FIG. 4. A relatively high amplitude level labelled "A", "C", and "E" is provided in response to the white target areas, while the relatively lower amplitude labelled "B" and "D" is provided by the black target areas. This signal representing the relative contrast of the target being viewed is applied to the alarm processor 46 which provides an alarm signal when the relative amplitude changes by a predetermined amount.

Figure 6:
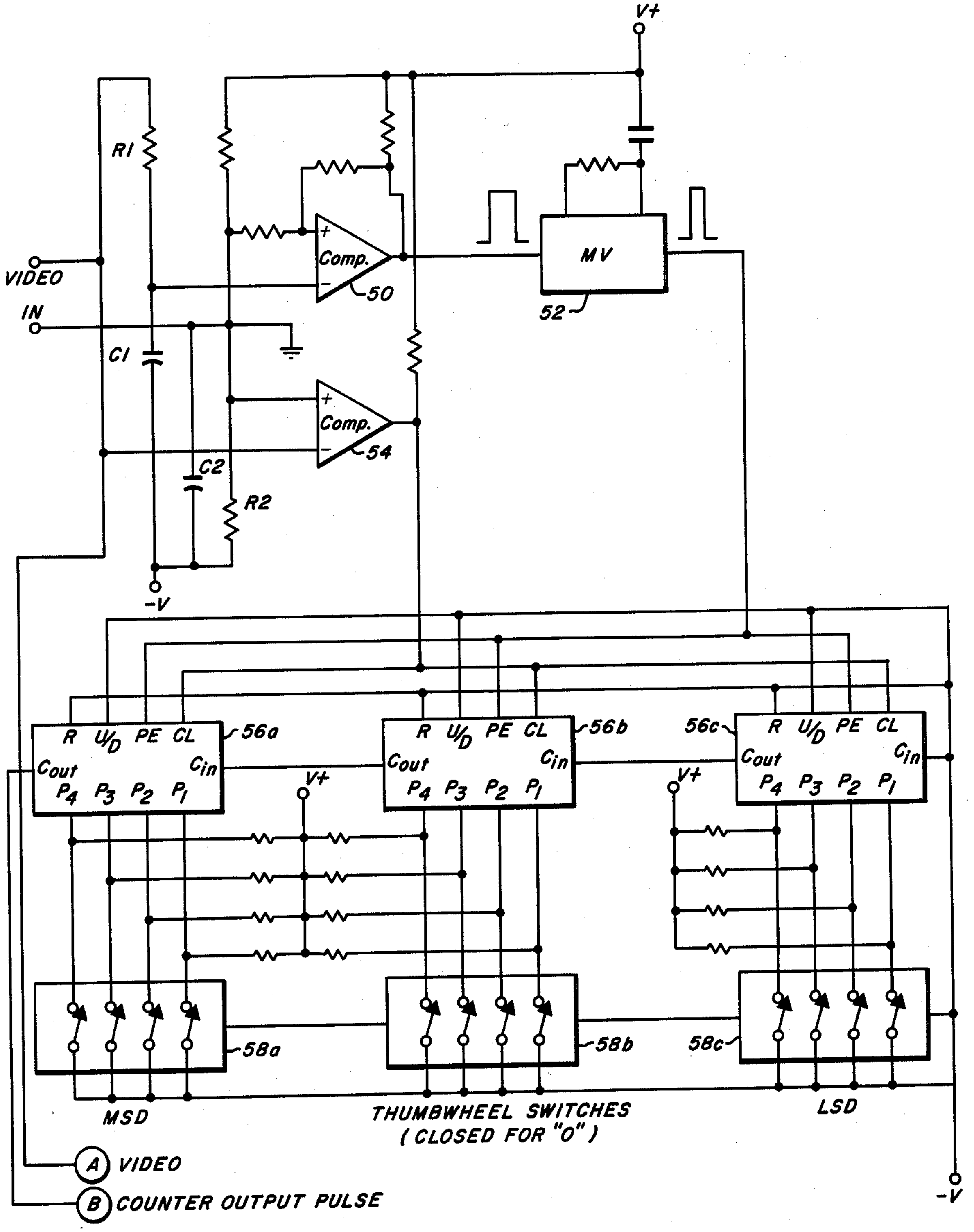
FIG. 6 is a schematic circuit diagram of the line selector of FIG. 3.

The line selector circuit 42 is illustrated in FIG. 6, and in the illustrated embodiment is operative to receive and process a standard RS 172 CCTV composite video signal. Each frame synchronization pulse, which is a 250 microsecond pulse which denotes the start and duration of each frame, is detected by an integrator composed of resistor R1 and capacitor C1 and is shaped by a comparator 50. The comparator 50 signal triggers a one-shot multivibrator 52, which produces a pulse of standard width and height. The line sync pulses are detected by an integrator composed of capacitor C2 and resistor R4, and are shaped by comparator 54. The pulses from multivibrator 52 and comparator 54 control the up/down counters 56*a*, 56*b*, and 56*c*, which function as a three-decade counter. An array of BCD switches 58*a*, 58*b*, and 58*c* are coupled to respective counters and are manually adjustable to preset the respective counters to a predetermined line number. The frame sync pulse causes presetting of the counters to the number determined by the setting of the BCD switches. The counter is decremented by each line sync pulse until a "0" count is reached, whereupon a gating signal is generated by the counter which is of a duration equal to the width of one scan line.

Figure 7:
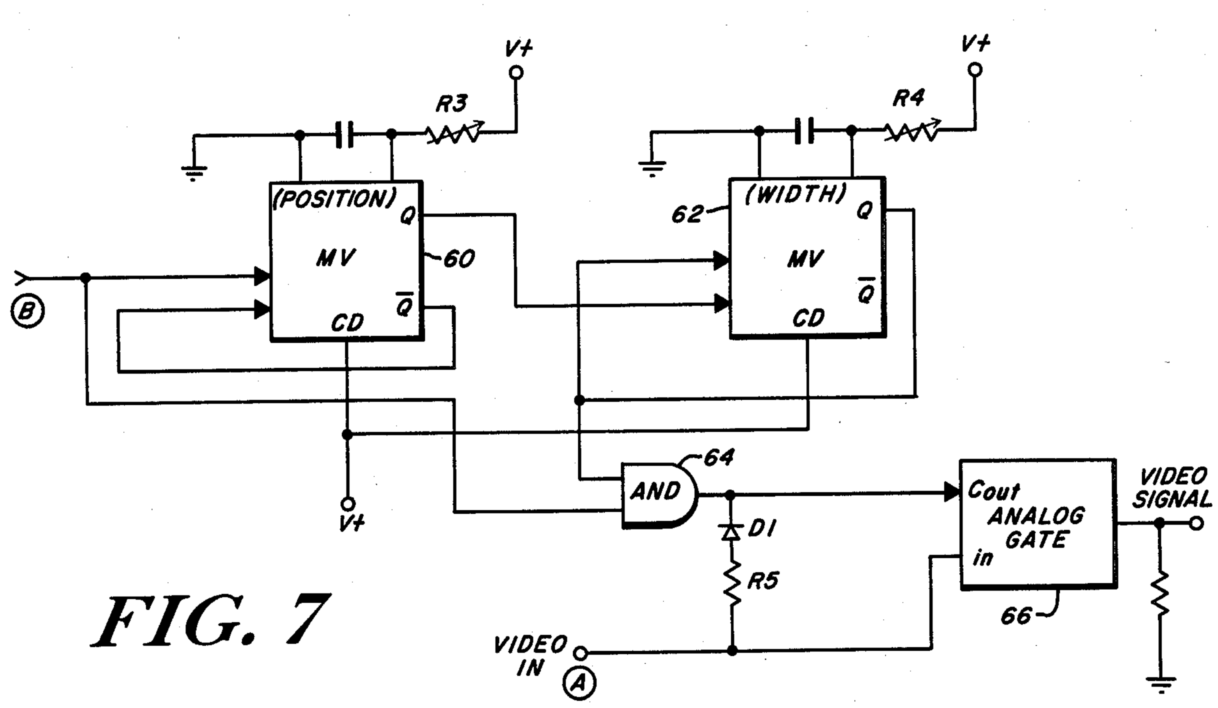
FIG. 7 is a schematic circuit diagram of the line segment selector of FIG. 3.

The counter output pulse appears at terminal B of FIG. 6 and is provided as an input signal to the line segment selector circuit of FIG. 7. The counter output pulse is applied to an input of a non-retriggerable one-shot multivibrator 60. The multivibrator 60 triggers on the leading edge of the input pulse, and the duration of its delay time is adjustable by various resistor R3. The multivibrator provides a normally low logic level as an output, and this logic level goes high for the duration of the delay time. The output of the multivibrator 60 is applied to an input of a second non-retriggerable multivibrator 62 which triggers on the negative edge of the input pulse. The delay time of the multivibrator 62 is adjusted by the variable resistor R4. The output pulse from multivibrator 62 is applied as one input to an AND gate 64 which also receives the counter output signal from terminal B. The AND gate 64 is operative to limit the output signal to one line. The signal from the AND gate is applied to an input of an analog gate 66 which also receives the video signal from terminal A. The analog gate is enabled for the duration of the gating signal provided via AND gate 64 and provides an output signal of the selected scan line and selected segment of that scan line. The diode D1 and resistor R5 serve as a load for the video signal and produce a black cursor signal on the video output signal to provide a visual indication on the monitor screen of the selected area of the video frame employed for viewing the multicontrast target for detection of smoke along the viewing path.

Only a small portion of the video frame is employed for smoke detection, and the other portions of the video frame are available for other functions such as intrusion detection, access control, or visual surveillance of an area. The video camera can provide a picture on a monitor screen which is substantially unaffected by the use of a scan line for smoke monitoring. The monitor screen can have cursor indication of the picture area in which smoke monitoring occurs, as noted above, or alternatively, no visual cursor need be shown on the monitor screen. The video camera can thus be employed for visual surveillance and similar purposes along with its function as the sensor for smoke monitoring and detection. Different areas of the video frame can also be employed for monitoring respective alarm conditions. Such an embodiment is illustrated in FIG. 8 in which a second signal processing channel is employed for intrusion detection.

Figure 8:
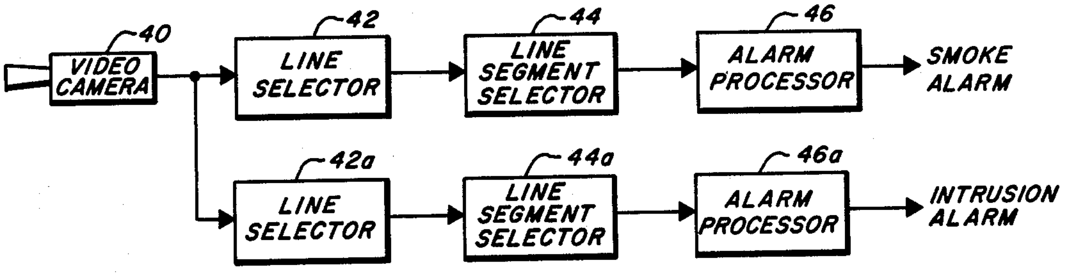
FIG. 8 is a block diagram of a further embodiment in which the video camera is employed for both smoke detection and intrusion detection.

Referring to FIG. 8, the video camera 40 is coupled to a smoke detection channel which includes line selector 42, line segment selector 44, and alarm processor 46, as described above. The video camera 40 is also connected to an intrusion detection channel composed of a line selector 42*a*, a line segment selector 44*a*, and an alarm processor 46*a*. The circuits 42*a* and 44*a* can be the same as the circuits 42 and 44 previously described, and are employed to select a different line of the video frame for intrusion detection than the selected line employed for smoke detection. The intrusion alarm processor 46*a* includes alarm threshold and detection circuitry for providing an intrusion alarm signal received by the processing channel which meets the intended detection criteria. Thus, different alarm channels and alarm processors can be provided for the respective smoke and other alarm conditions being monitored, and for which the single video camera is employed as a sensor.

The video camera usually contains an automatic gain control circuit to provide a substantially uniform output for variations in ambient light level. The change in contrast of the multicontrast target is sufficient to provide a detectable change in the video signal for smoke detection purposes. The system is also operative with infrared as well as visual radiation. The video camera is often sensitive into the infrared spectrum, or specific infrared sensitive detectors can be employed, either of the scanning or discrete type.

The invention is not to be limited by what has been particularly shown and described except as indicated in the appended claims.

What is claimed is:

1. A multi-contrast target having one or more relatively dark areas and one or more relatively light areas and disposed in an area being monitored;
   - sensing means separated from the target in the area being monitored and including means for separately viewing the contrasting sensible areas of the target and providing an output signal representative of the relative contrast of the separately viewed target areas;
   - said sensing means including means for deriving an AGC signal from an area of the target; and
   - means operative in response to said output signal to provide an alarm signal when said output signal changes by a predetermined amount caused by the presence of particles in the area being monitored.

2. The system of claim 1 wherein said target includes alternating lighter and darker stripes.

3. The system of claim 1 wherein said target includes alternating white and black areas.

4. The system of claim 1 wherein said sensing means includes a plurality of sensors, each viewing a respective area of the target.

5. The system of claim 1 wherein said sensing means includes a single sensor viewing the target areas.

6. The system of claim 1 wherein the sensing means includes one or more sensing elements and means for imaging the areas of the target onto the one or more sensors.

7. An alarm system comprising:
   - a target disposed in an area being monitored and having sensible areas of contrast;
   - a video camera separated from the target in the area being monitored and having a video frame which includes the target;
   - means operative in response to the video signal for selecting a portion of the video frame in which separate contrasting sensible areas of the target are scanned and providing signals representative of the light from different ones of said separate contrasting areas; and
   - means for deriving from said signals an output signal representing the relative contrast of separate contrasting areas of the target.

8. The system of claim 7 including means operative in response to the output signal to produce an alarm signal when the output signal changes by a predetermined amount.

9. The system of claim 7 including means operative in response to the video signal from said video camera for providing an output indication of an alarm condition other than smoke detection.

10. An alarm system comprising:
   - a video camera operative to scan an area being monitored and to provide a video output signal representative of the monitored area;
   - a target disposed in the area being monitored and having separate sensible areas of contrast for scanning by the video camera;
   - means operative in response to the video signal for selecting a portion of the scanned field which includes said separate contrasting sensible areas of said target and for providing signals having amplitudes representative of the separate contrasting sensible areas of selected portion;
   - means operative in response to changes in the relative contrast indicated by changes in the relative amplitude of said signals to provide an alarm signal when the change in said relative contrast changes by a predetermined amount caused by the presence of smoke in the area being monitored; and
   - means operative in response to the video signal to provide a visual representation of the area being monitored.

11. A multi-contrast target having one or more relatively dark areas and one or more relatively light areas and disposed in an area being monitored;
   - a scanning sensor means operative to scan each area of the target and provide an output signal representative of the relative contrast of the target areas;
   - the scanning sensor means including:
   - a video camera having a video frame which includes the target;
   - a line selection circuit for selecting a scan line of the video frame which scans the target; and
   - a line segment selection circuit operative to select a portion of the selected scan line which includes the target; and
   - means operative in response to said output signal to provide an alarm signal when said output signal changes by a predetermined amount caused by the presence of particles in the area being monitored.

* * * * *

UNITED STATES PATENT AND TRADEMARK OFFICE
CERTIFICATE OF CORRECTION

PATENT NO. : 4,614,968
DATED : September 30, 1986
INVENTOR(S) : William J. Rattman It is certified that error appears in the above-identified patent and that said Letters Patent is hereby corrected as shown below:

Column 1, line 64, "on both" should read --in both--.

Column 2, line 57, "contast" should read --contrast--.

Column 3, line 30, "videocamera" should read --video camera--.

Column 3, line 47, "scross" should read --across--.

Column 4, line 33, "various" should read --variable--.

Column 4, line 63, "have cursor" should read --have a cursor--.

Signed and Sealed this

Nineteenth Day of January, 1988

*Attest:*

DONALD J. QUIGG

*Attesting Officer*

*Commissioner of Patents and Trademarks*